(No Model.)
J. H. JOHNSTON.
APPARATUS FOR BREAKING HORSES.
No. 508,172. Patented Nov. 7, 1893.
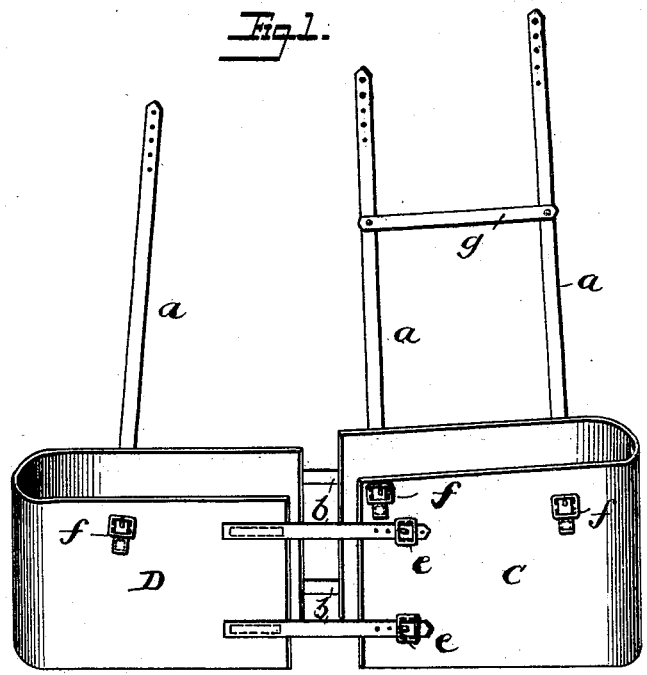
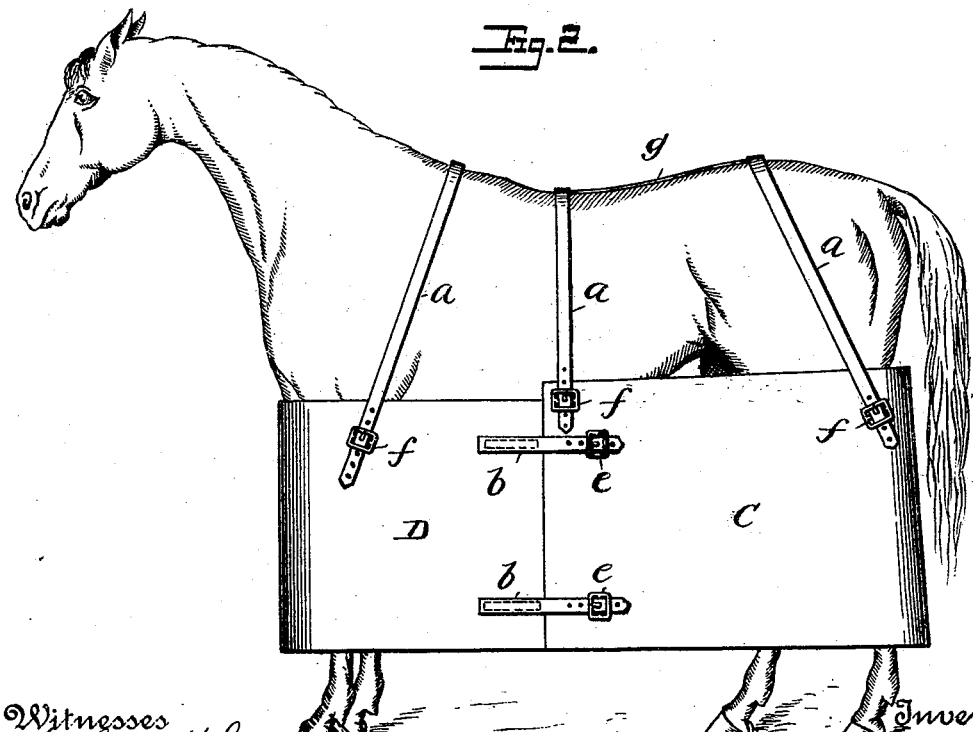

UNITED STATES PATENT OFFICE.

JAMES H. JOHNSTON, OF MONTCLAIR, COLORADO.

APPARATUS FOR BREAKING HORSES.

SPECIFICATION forming part of Letters Patent No. 508,172, dated November 7, 1893.

Application filed December 16, 1891. Serial No. 415,306. (No model.)

*To all whom it may concern:*

Be it known that I, JAMES H. JOHNSTON, a citizen of the United States, residing at Montclair, in the county of Arapahoe and State of Colorado, have invented certain new and useful Improvements in Apparatus for Breaking Horses, of which the following is a specification.

My invention relates to improvements in apparatus for breaking and taming horses and mules, and the object of my improvements are; first, to acquaint the animal with foreign touch and restraint; second, to bring the animal under subjection to his master without undue force, and without danger of sprain or other injury whatsoever. I attain these objects by the device illustrated in the accompanying drawing, in which the figure is a view of the entire harness as it appears ready for use.

D consists of a strip of harness leather or other stout material, and is made twenty-one inches wide by five and one-half feet in length.

C consists of a strip of like material, and is made twenty-five inches wide by six feet in length. These strips are joined in a band by the straps buckled at $e$, permitting a ready adjustment.

Straps $a\ a\ a$ pass over the back of the animal and are buckled at $f\ f\ f$. The rear straps $aa$ are prevented from spreading by a connecting strap $q$. This harness is dropped around the legs of the animal and is suspended from the back at the belly as shown in the drawing. Thus equipped, the animal may be driven to a vehicle without possible danger, being unable to run away, rear, strike or kick. It may be permitted to go at will in a two-wheeled vehicle, and left to graze without bridle or halter, being unable to run and thus get away. The animal thus equipped, becomes accustomed to restraint and handling, and, after a few lessons in this harness, becomes docile and perfectly safe either to drive, or to handle in the usual manner and with usual care.

Having fully described my invention, what I claim, and desire to secure by Letters Patent, is—

An apparatus for breaking horses comprising two strips and means for connecting them arranged to embrace the legs of the animal and suspensory strips arranged to pass over the back of the animal for adjusting and holding the strips in position substantially as described.

J. H. JOHNSTON.

Witnesses:
E. W. CHAPPEL,
WILL H. SPURGEON.